United States Patent Office 2,943,103
Patented June 28, 1960

2,943,103
BIS(ALKOXYSILYLPROPYL)AMINES

Victor B. Jex, Clarence, and Donald L. Bailey, Snyder, N.Y., assignors to Union Carbide Corporation, a corporation of New York No Drawing. Filed Feb. 24, 1958, Ser. No. 716,842

3 Claims. (Cl. 260—448.8)

This invention relates to new secondary amines containing silicon chemically combined therein. More particularly, this invention relates to bis(alkoxysilylpropyl)-amines which can be represented by the formula:

$$HN[CH_2CH_2CH_2Si(OR)_{3-a}]_2 \quad \text{with } R'_a$$

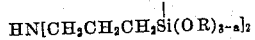

where R is an alkyl group, R' is hydrogen, aryl, or alkyl, and $a$ is an integer from 0 to 2. Examples of alkyl groups which R and R' represent include phenyl and naphthyl. Typical of our novel amines are bis(triethoxysilylpropyl)-amines, bis(trimethoxysilylpropyl)amine, bis(tripropoxy-silylpropyl)amines, bis(diethoxymethylsilylpropyl)amine, bis(diethoxyphenylsilylpropyl)amine, bis(ethoxydimethylsilylpropyl)amine, and the like. Thus, the secondary trifunctional silylpropylamines represented by the formula:

$$HN[CH_2CH_2CH_2Si(OR)_3]_2$$

where R is as previously defined are included.

The new compounds of this invention have been found to be useful as finishes for fibrous glass materials prior to the preparation of reinforced plastics therefrom. We have found that reinforced plastics such as laminates, prepared from fibrous glass materials and thermosetting resins such as the aldehyde condensation resins, the epoxy resins, and the urethane resins, having a superior glass-to-resin bond are produced by subjecting the fibrous glass materials, prior to lamination to a treatment with a compound of the type described herein.

A particularly desirable property of the new compounds of this invention is their ability to form stable solutions with aqueous organic admixtures or with water. Consequently, these compounds make possible the finishing of fibrous glass materials without the necessity of employing costly anhydrous organic solvents which are, in many cases, flammable. When the amines of this invention are dissolved in water or in aqueous admixtures of organic compounds, the alkoxy groups are hydrolyzed and subsequently condensed to soluble polysiloxanes. The polysiloxanes thus formed can be represented by the formula:

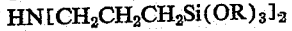

$$HN\left[CH_2CH_2CH_2SiO_{\frac{3-a}{2}}\right]_2 \quad \text{with } R'_a$$

and include trifunctional siloxanes which are represented by the formula:

$$HN[CH_2CH_2CH_2SiO_{3/2}]_2$$

where R' and $a$ are as previously defined.

The compounds of this invention are prepared by the reaction of a gamma-chloropropylalkoxysilane with ammonia, under pressure, at elevated temperatures. The reaction which takes place is illustrated by the general equation:

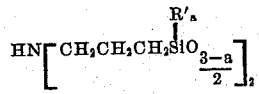

$$2ClCH_2CH_2CH_2Si(OR)_3 + 3NH_3 \longrightarrow$$

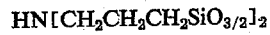

$$HN[CH_2CH_2CH_2Si(OR)_{3-a}]_2 + 2NH_4Cl$$

where R, R', and $a$ are as previously defined.

The reaction by which the compounds of our invention are prepared is conducted in a suitable pressure vessel at temperatures of at least 90° C. and at pressures which are above atmosphere. The pressure employed may be autogenous or it may be applied by means of suitable equipment. Also formed in the reaction are mono- and tris-(alkoxysilylpropyl)amines which can be separated from the bis(alkoxysilylpropyl)amines as by distillation. The proportions of the mono-, bis-, and tris-(alkoxysilyl-propyl)amines obtained by the reaction can be controlled by the use of varying amounts of ammonia. A mole ratio of between 10 and 15 moles of ammonia per mole of gamma-chloropropylalkoxysilane is preferred in order to provide high yields of bis(alkoxysilylpropyl)amine. Mole fractions of ammonia to gamma-chloropropylalkoxysilane of less than 10 lower the yield of bis(alkoxysilylpropyl)amine in favor of tris(alkoxysilylpropyl)amine and mole fractions of ammonia to gamma-chloropropylalkoxysilane of over 15 decrease the yield of bis(alkoxysilylpropyl)amine in favor of the formation of mono-(alkoxysilylpropyl)amine. Our secondary amines are unique in that they are hydrolytically stable under acidic or basic conditions. This property distinguishes our amines over similar amines of the type containing a single methylene group connecting nitrogen to silicon such as the alkoxysilylmethylamines which are extremely unstable in water under any conditions of acidity or basicity.

This application is a continuation in part of application Serial No. 483,421, filed January 21, 1955, now U.S. Patent No. 2,832,754.

Example

To a three-liter pressure vessel were charged 1.5 moles (365 grams) of gamma-chloropropyltriethoxysilane and 15 moles (255 grams) of liquid ammonia. The vessel was sealed and heated to a temperature of 100° C. for a period of 12 hr. After heating, the vessel was cooled to room temperature and the gaseous ammonia present in the vessel bled off. The residual products which consisted of a liquid and white solid were removed from the vessel and filtered. The solid was then washed with anhydrous diethyl ether and discarded. The filtrate and washings were combined and fractionally distilled in a packed column under reduced pressure. Bis(triethoxysilylpropyl)amine was obtained in the fraction boiling at 145° C. to 150° C. (under 1 millimeter mercury absolute pressure). The amount of bis(triethoxysilylpropyl)amine obtained represented a 30 percent yield prepared on the amount of starting gamma-chloropropyltriethoxysilane. The product had a refractive index, $n_D^{25}$ of 1.4280 and a neutralization equivalent of 406.7.

What is claimed is:

1. An amine of the formula

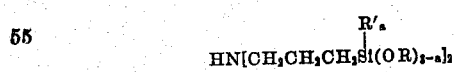

$$HN[CH_2CH_2CH_2Si(OR)_{3-a}]_2 \quad \text{with } R'_a$$

where R is alkyl, R' is from the class consisting of hydrogen, alkyl, and aryl, $a$ is an integer from 0 to 2.
2. Bis(trialkoxysilylpropyl)amine.
3. Bis(triethoxysilylpropyl)amine.

References Cited in the file of this patent

UNITED STATES PATENTS

| | | |
|---|---|---|
| 2,715,133 | Speier | Aug. 9, 1955 |
| 2,754,311 | Elliott | July 10, 1956 |
| 2,762,823 | Speier | Sept. 11, 1956 |
| 2,835,690 | Prober | May 20, 1958 |

FOREIGN PATENTS

| | | |
|---|---|---|
| 1,065,545 | France | Jan. 13, 1954 |

UNITED STATES PATENT OFFICE

CERTIFICATE OF CORRECTION

Patent No. 2,943,103                              June 28, 1960

Victor B. Jex et al.

It is hereby certified that error appears in the above numbered patent requiring correction and that the said Letters Patent should read as corrected below.

Column 1, line 23, for "alkyl" read -- aryl --; line 24, strike out "R and".

Signed and sealed this 12th day of September 1961.

(SEAL)
Attest:

ERNEST W. SWIDER                                       DAVID L. LADD

Attesting Officer                                         Commissioner of Patents

USCOMM-DC